United States Patent Office 3,089,456
Patented May 14, 1963

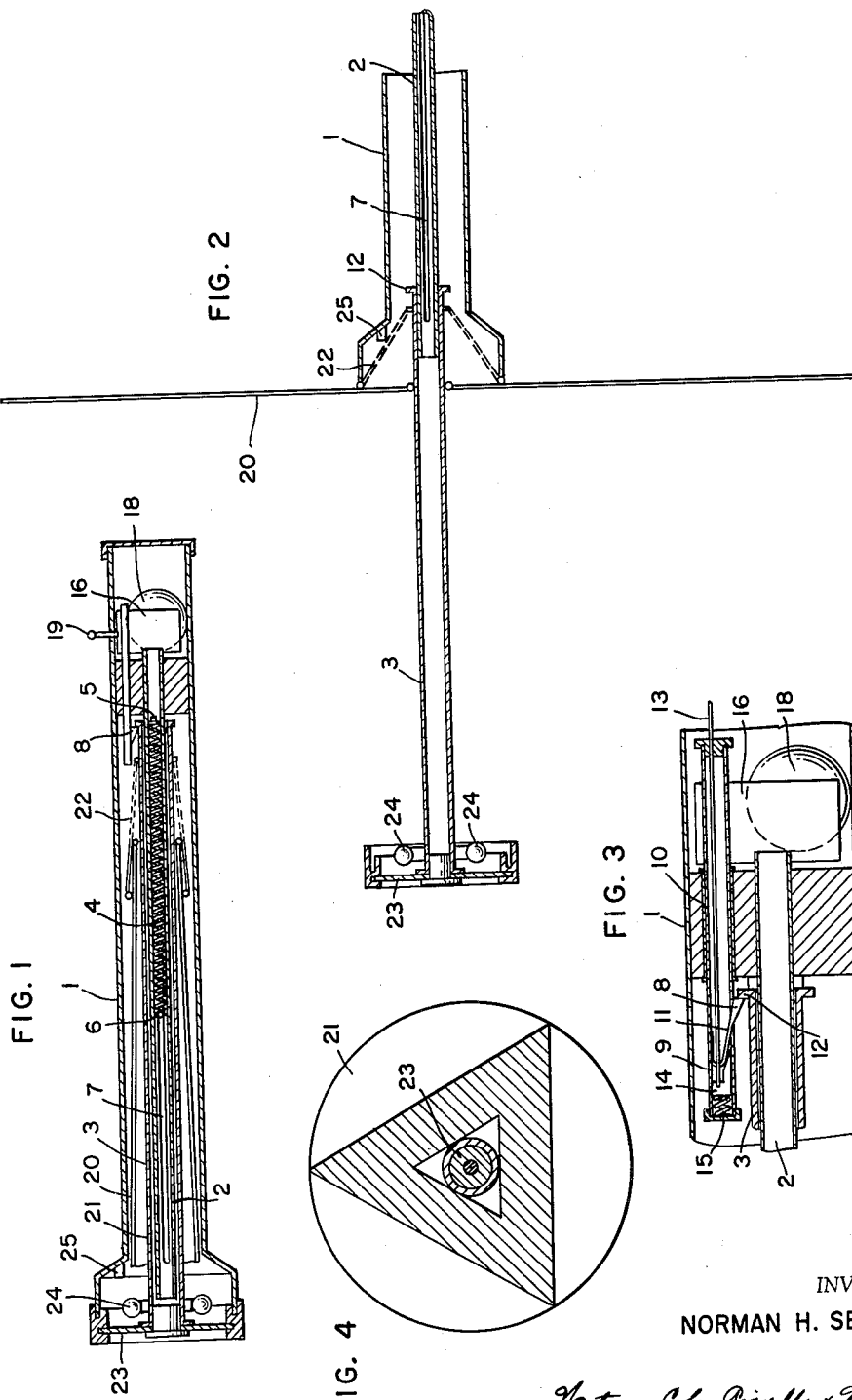

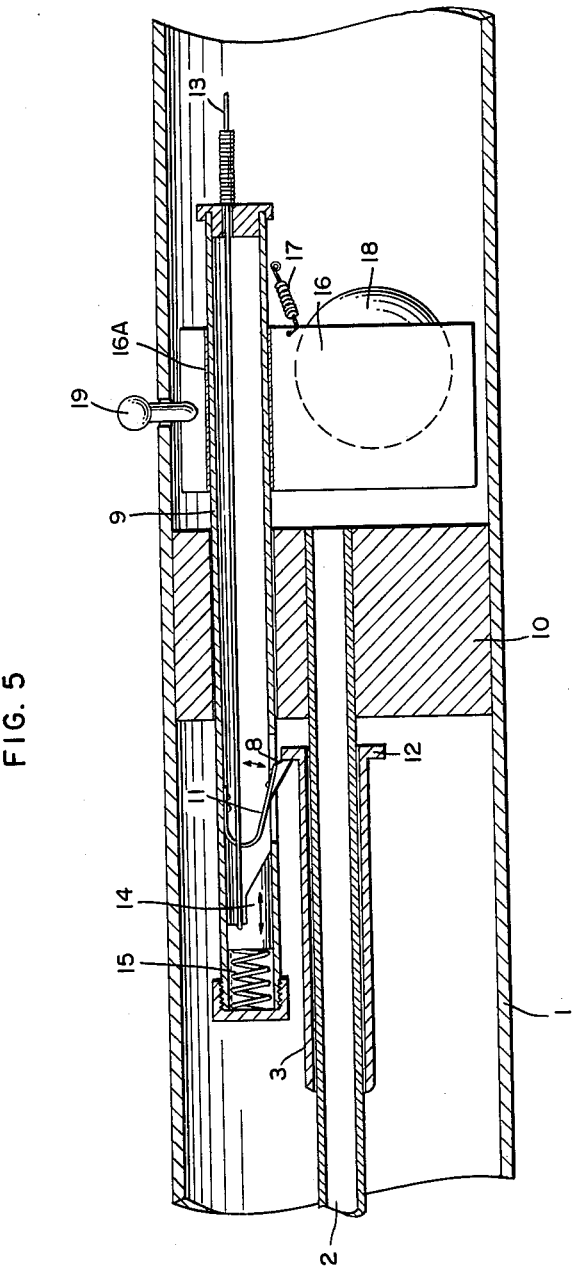

3,089,456
VISUAL WARNING DEVICES
Norman Hastings Servais, 30 Ludlow Road, Vredehoek, Cape Town, Cape Province, Republic of South Africa
Filed July 6, 1961, Ser. No. 122,317
Claims priority, application Republic of South Africa Oct. 5, 1960
5 Claims. (Cl. 116—30)

This invention relates to a visual warning device which is particularly suitable for road safety purposes when used in conjunction with a motor vehicle.

Road accidents occurring at night are always a hazard to oncoming motorists. The red reflectors on a motor vehicle are usually made of glass or plastic and are often broken or seriously misplaced with the impact, resulting in no warning of the accident being conveyed to other motorists.

The object of this invention is to provide a warning device which in the normal course of events is inoperative and only comes into effect after the accident has occurred. A further object is to protect the warning device by housing it in a container until it is actually required.

According to the invention there is provided a warning device comprising a fixed inner member carrying a slidable spring loaded outer tube upon which is mounted a source of illumination, a collapsible sheet of light-reflecting material and means to release the said outer tube and to unfurl the collapsible sheet.

It is further provided that the outer tube can be released manually or automatically as a result of a sudden change in momentum.

An embodiment of this invention will be described with reference to the attached drawings in which:

FIG. 1 is a view in vertical longitudinal section of the warning device in the telescoped position before being triggered off, FIG. 2 is a similar view of the rearward portion of the device on an enlarged scale and in condition after being triggered off, FIG. 3 is an enlarged detailed view in vertical section of the trigger mechanism illustrated in FIGURE 1 before being automatically set off, FIG. 4 is a front view showing the disc and reflector on a smaller scale, and FIG. 5 is a greatly enlarged view in vertical section of the right-hand portion of the mechanism as illustrated in FIGURE 1.

The warning device is mounted in a housing 1 in a motor vehicle and comprises a fixed inner tube 2 which has an outer tube 3 slidably mounted thereon.

The outer tube 3 is spring loaded to be projected a fixed distance along the length of the inner tube. This is conveniently effected by a spring 4 in the inner tube 2 compressed between a stop 5 in the inner tube 2 and a pin 6 secured to the outer tube 3 and passing through diametrically opposite slots 7 in the inner tube 2, said slots extending the major portion of the length of the inner tube.

The outer tube 3 is prevented from being projected by a trigger 8 which may be operated either manually or automatically by a sudden momentum change as would generally happen when an accident occurs. As shown in FIG. 3 the trigger 8 may consist of a sleeve 9 rotatably mounted in a bearing 10 and projecting on each side thereof.

On the one side of the sleeve 9 is a trigger wedge 8 loaded by a flat spring 11 to engage a flange 12 on the outer tube 3. A Bowden cable 13 extends through the sleeve 9 to engage a further wedge 14 slidable in relation to the sleeve 9 such that when the Bowden cable 13 is pulled it lifts the trigger wedge 8 so that the latter disengages from the flange 12 on the outer tube 3. When the Bowden cable 13 is released, a return spring 15 again cocks the wedge 14 for further use.

On the opposite side of the bearing the sleeve is connected by welding 16A with a diametrically extending flap 16 which is spring loaded as at 17 to press on a loose ball 18. On occurrence of an impact the ball 18 due to its own momentum moves away from under the flap 16 so that the latter, together with the sleeve 9 to which it is attached, rotates due to the spring loading of the flap. The rotation of the sleeve 9 causes corresponding rotation of the triggering wedge 8 which thus disengages from the flange 12. A projecting pin 19 is provided to rotate the flap 16 to enable the ball 18 to be repositioned. It will be noted that when the device is operated manually the ball 18 is not misplaced.

Hinged to the inner end of the outer tube 3 are ribs 20 in turn fixed to a flexible sheet 21 having a light reflecting surface. The ribs 20 are spring loaded as at 22 to unfurl the sheet 21 so that it extends at right angles to the axis of the outer tube 3. Since in the telescoped or collapsed position of the device the reflective sheet assembly is accommodated in the housing 1 provided by the motor vehicle the latter prevents the ribs 20 unfurling the sheet 21.

At the end of the outer tube 3 opposite that to which the ribs 20 are hinged, is mounted a coloured window 23 and one or more light bulbs 24 for illuminating it.

On being released either manually or otherwise the outer tube 3 is shot out of the housing 1 to the extent allowed by the slots 7 in the inner tube 2. The collapsible sheet assembly 21 is unfurled and maintained in a rigid position by the two light springs 22. The electric bulbs 24 are illuminated by an automatic switch 25 which is triggered off by the spring 22 on the outer tube 3 at the extremity of its projection and the light therefrom is visible to approaching motorists through the window 23 as well as being reflected off the light-reflecting sheet 21.

It will be clear that the approaching motorist is subjected mainly to reflected light since only a small proportion of the light shines through the coloured window 23 and is therefore unlikely to be dazzled. In case the electric supply fails due to the accident, the importance of the light-reflecting surface on the sheet 21 is obvious.

The warning device can be restored to its original position by folding the sheet 21 back about the outer tube 3 and sliding the assembly into the housing 1 against the spring loading 4 until it is locked into position by the trigger mechanism.

The device can be installed quite easily on all vehicles both in the front as well as the back in conjunction with the normal lighting system, and although the embodiment has been described for use with a vehicle it is also possible to use it in aircraft.

What I claim as new and desire to secure by Letters Patent is:

1. A warning device comprising a fixed inner member, an outer member slidably mounted on said inner member, a source of illumination mounted on the outer member, a collapsible sheet of light reflecting material and ribs for unfurling said material both mounted on the outer member, means for restraining the ribs from unfurling said material only when the outer member is in its inner position, a spring loading the outer member to move outwardly and a change of momentum responsive trigger mechanism restraining the outer member from outward movement.

2. A warning device comprising a fixed inner member, an outer member slidably mounted on said inner member, a source of illumination mounted on the outer member, a collapsible sheet of light reflecting material and ribs for unfurling said material both mounted on the outer member, means for restraining the ribs from unfurling said material only when the outer member is in its inner position, a spring loading the outer member to move outwardly, a change of momentum responsive trigger mechanism restraining the outer member from outward movement, and a manually override release means associated with said trigger mechanism.

3. A warning device in accordance with claim 1 in which the change of momentum responsive trigger mechanism comprises a housing, a bearing mounted in said housing, a supporting member projecting through the bearing and rotatable therein, a flap depending from the inner end of the supporting member and secured to the latter, a ball accommodated in the housing and movable between a position adjacent the flap in which it restrains rotation of the latter, and a position clear of the flap, a spring loading the flap and supporting member to rotate in one direction and a trigger on the outer portion of the supporting member bearing against a stop on the said outer member, said trigger movable to a position clear of the stop on rotation of the supporting member.

4. A warning device in accordance with claim 1 in which the change of momentum responsive trigger mechanism comprises a housing, a bearing mounted in said housing, a supporting member projecting through the bearing and rotatable therein, a flap depending from the inner end of the supporting member and secured to the latter, a ball accommodated in the housing and movable between a position adjacent the flap in which it restrains rotation of the latter, and a position clear of the flap, a spring loading the flap and supporting member to rotate in one direction, a trigger mounted on the outer portion of the supporting member and movable in relation thereto, said trigger bearing against a stop on said outer member, said trigger rotatable to a position clear of the stop on rotation of the supporting member and a cable release mechanism associated with the trigger to enable release of the latter without rotation of the sleeve.

5. A warning device in accordance with claim 1 in which the source of illumination is mounted on the outer end of the outer member and the said ribs are pivotally attached to said outer member at positions adjacent the inner end of said outer member.

References Cited in the file of this patent
UNITED STATES PATENTS
2,764,120    Payette _____ Sept. 25, 1956